US008867443B2

(12) United States Patent
Qiu et al.

(10) Patent No.: US 8,867,443 B2
(45) Date of Patent: Oct. 21, 2014

(54) METHOD AND APPARATUS FOR ESTIMATING FREQUENCY DEVIATION

(75) Inventors: Ning Qiu, Guangdong Province (CN); Qiang Li, Guangdong Province (CN); Wenqi Zeng, Guangdong Province (CN); Tiankun Yu, Guangdong (CN); Zhongwei Liu, Guangdong (CN); Yannan Xing, Guangdong Province (CN); Lihong Liang, Guangdong Province (CN); Liwen Li, Guangdong Province (CN); Feng Lin, Guangdong Province (CN); Jintao Chu, Guangdong Province (CN)

(73) Assignee: ZTE Corporation, Shenzhen, Guangdong (CN)

( * ) Notice: Subject to any disclaimer, the term of this patent is extended or adjusted under 35 U.S.C. 154(b) by 107 days.

(21) Appl. No.: 13/258,448

(22) PCT Filed: Nov. 17, 2010

(86) PCT No.: PCT/CN2010/078830
§ 371 (c)(1),
(2), (4) Date: Sep. 21, 2011

(87) PCT Pub. No.: WO2011/127730
PCT Pub. Date: Oct. 20, 2011

(65) Prior Publication Data
US 2013/0021966 A1 Jan. 24, 2013

(30) Foreign Application Priority Data
Apr. 15, 2010 (CN) .......................... 2010 1 0148719

(51) Int. Cl.
*H04W 56/00* (2009.01)
*H04B 1/7087* (2011.01)
(52) U.S. Cl.
CPC .................................. *H04B 1/7087* (2013.01)

USPC ........... 370/328; 375/344; 375/326; 375/329; 375/149; 375/150

(58) Field of Classification Search
CPC .............. H04W 56/00; H04L 27/2657; H04L 27/2675; H04J 13/00
USPC ........... 370/328; 375/344, 326, 329, 149, 150
See application file for complete search history.

(56) References Cited

U.S. PATENT DOCUMENTS 8,134,911 B2 * 3/2012 Yang et al. .................... 370/203
2007/0160158 A1 * 7/2007 Zeng et al. .................... 375/260

FOREIGN PATENT DOCUMENTS

| CN | 1917408 A | 2/2007 |
| CN | 101075845 A | 11/2007 |
| WO | 2005053258 A2 | 6/2005 |

OTHER PUBLICATIONS

International Search Report for PCT/CN2010/078830 dated Feb. 12, 2011.

*Primary Examiner* — Charles C Jiang
*Assistant Examiner* — Jamal Javaid
(74) *Attorney, Agent, or Firm* — Ling Wu; Stephen Yang; Ling and Yang Intellectual Property (57) ABSTRACT

The invention provides a method and an apparatus for estimating frequency deviation, the method comprising: after receiving a sub-frame, transforming a downlink synchronized code of the sub-frame to a frequency domain, and performing a correlation operation between the transformed downlink synchronized code and a local frequency domain synchronized code to obtain a conjugate downlink synchronized code sequence; judging a location of a maximum value in the conjugate downlink synchronized code sequence, and calculating a frequency deviation value according to the location of the maximum value. The estimating method provided in the invention can realize a stable work with no need of a precise sampling value location, an accurate timing synchronization, or even obtaining the information for the multi-path distribution and locations.

15 Claims, 7 Drawing Sheets

METHOD AND APPARATUS FOR ESTIMATING FREQUENCY DEVIATION

TECHNICAL FIELD

The present invention relates to a time division-synchronized code division multiple access (TD-SCDMA) system, and especially to a method and an apparatus for estimating frequency deviation.

BACKGROUND OF THE RELATED ART

TD-SCDMA (time division-synchronized code division multiple access) is one of the three main standards for 3G (the third generation telecommunication) and has an extensive application prospect.

Both a BS (base station) and a UE (user equipment) transmit and receive in nominal carrier frequencies in the TD-SCDMA system. There is a deviation between a practical transmitting frequency and a practical receiving frequency for the level limitation of equipments. TD-SCDMA system requires that the carrier frequency error of a BS is less than 0.05 PPM, and requires that the carrier frequency error of a UE is less than 0.1 PPM. At the BS side, the frequency precision of an oscillator can meet the requirement since the limitation, such as of temperature, volume, power consumption and cost and so on, is low; but at the UE side, the frequency precision of a selected crystal oscillator usually can not meet the requirement for the limitation of various factors. The function of AFC (automatic frequency control) is to correct the carrier frequency error between the BS and the UE to ensure the performance of the subsequent demodulation and decoding.

The existing frequency deviation estimations are performed usually according to the DwPTS (downlink pilot timeslot) and the Midamble in a beacon channel. Its principle is to divide the data into a front part and a rear part, which are then estimated respectively, and the carrier frequency deviation is calculated according to the difference between the phase rotations of the estimation values of the two parts.

Due to the limitation of the short characteristic of the synchronized code, the deviation of sampling locations or the multi-path distribution will cause the existing method to degrade obviously to a biased estimation near the 0 frequency, and this kind of deviation is difficult to solve through AFC control strategy, and only can the approach of trying to maintain the work situation be used to reduce this kind of influence. For example:

(1) realizing more accurate timing to ensure the sampling value location deviation is far less than ¼ chip (a time unit, 1.128 Ms).

(2) using multi-path location estimation technology, such as inter-path interference cancellation, multi-path channel reconfiguration and so on, to impress the negative effect of the multi-path interference.

However, a series of new problems are brought in the system by the introduction of the above technology:

(1) the errors of the above estimation and cancellation technologies themselves bring in new interferences, which reduce the performance and stability.

(2) most of the technologies need a high frequency precision as a premise, and the effect of such estimations and cancellations will decrease along with the reduction of the frequency deviation estimation performance, and will further cause reduction of the frequency deviation estimation performance, thus causing a vicious circle and the system to be not stable enough.

(3) in a bad situation, how to realize the above technologies is a difficulty itself, which increases the realization complexity and developing period.

SUMMARY OF THE INVENTION

The invention provides a method and an apparatus for estimating frequency deviation to solve the problems, such as the reduction of performance and stability and so on, brought by use of the technologies, such as precise timing and multi-path location estimation, to realize elimination of the dependence of the frequency deviation estimation on precise timing and multi-path location estimation, and to improve the whole stability of the system.

To solve the above technical problems, the invention provides a method for estimating frequency deviation, the method comprising:

after receiving a sub-frame, transforming a downlink synchronized code of the sub-frame to a frequency domain, and performing a correlation operation between the transformed downlink synchronized code and a local frequency domain synchronized code to obtain a conjugate downlink synchronized code sequence; and judging a location of a maximum value in the conjugate downlink synchronized code sequence, and calculating a frequency deviation value according to the location of the maximum value.

The local frequency domain synchronized code may be a group of synchronized code sequences influenced by different frequency deviations. The method may further comprise: constructing the local frequency domain synchronized code in the following way: performing a frequency shift action on a preconfigured synchronized code; and, after completing the frequency shift action, eliminating an influence of a timing deviation and multi-path on the preconfigured synchronized code to obtain the local frequency domain synchronized code.

The step of performing a frequency shift action on a preconfigured synchronized code comprises: generating signals of different frequencies; multiplying each sample point in the preconfigured synchronized code respectively by $(j)^i$, wherein, j is a complex number unit, i is a number of a location of the each sample point in the preconfigured synchronized code; and multiplying the synchronized code after completion of the $(j)^i$ operation by the generated signals respectively.

The step of eliminating an influence of a timing deviation and multi-path on the preconfigured synchronized code comprises: transforming the preconfigured synchronized code to a frequency domain, and performing a differential operation on the synchronized code on the frequency domain to obtain the local frequency domain synchronized code. The method may further comprise: before transforming the preconfigured synchronized code to a frequency domain, performing a complementation for the preconfigured synchronized code to be adaptive to a base band signal. The complementation may be a raised cosine complementation.

The method may further comprise: before performing a differential operation on the synchronized code on the frequency domain, reordering each sample point of the synchronized code on the frequency domain according to a level of a frequency corresponding to each sample point.

Before the step of transforming a downlink synchronized code of the sub-frame to a frequency domain, the method may further comprise: searching for a location of the downlink synchronized code in the received sub-frame, cutting out a downlink synchronized code signal from the sub-frame according to a length of a data window; and if a number of sample points of the downlink synchronized code signal is not an integral multiple of a number of sample points of the local frequency domain synchronized code, then processing the downlink synchronized code signal to make the number of the sample points of the downlink synchronized code signal is an integral multiple of the number of the sample points of the local frequency domain synchronized code. The length of the data window may be equal to a chip length of the downlink synchronized code plus m chip length respectively on a left side and on a right side of the downlink synchronized code, wherein, m≥0.

The method may further comprise: when the number of the sample points of the downlink synchronized code signal is an integral multiple of the number of the sample points of the local frequency domain synchronized code, performing a differential operation on the downlink synchronized code signal. The method may further comprise: after performing the differential operation on the downlink synchronized code signal, performing a complementation to eliminate an influence of a fixed time domain timing deviation.

The step of obtaining a conjugate downlink synchronized code sequence comprises: after performing a correlation operation between the transformed downlink synchronized code and the local frequency domain synchronized code, discarding an imaginary part of each correlation operation result and retaining a real part of each correlation operation result to obtain the conjugate downlink synchronized code sequence.

The signals of different frequencies comprise a signal of 0 Hz frequency; the step of calculating a frequency deviation value according to the location where the maximum value comprises: multiplying a difference between the number of the location of the maximum value in the conjugate downlink synchronized code sequence and a number of the location of the 0 Hz frequency signal in the signals of different frequencies by a frequency interval of the signals of different frequencies to obtain the frequency deviation value.

Furthermore, the invention provides an apparatus for estimating frequency deviation, the apparatus comprising: a local frequency domain synchronized code constructing module and a frequency deviation estimating module which are interconnected, wherein, the local frequency domain synchronized code constructing module is configured to construct a local frequency domain synchronized code, and transmit the constructed local frequency domain synchronized code to the frequency deviation estimating module;

the frequency deviation estimating module is configured to: after receiving a sub-frame, transform a downlink synchronized code of the sub-frame to a frequency domain, and perform a correlation operation between the transformed downlink synchronized code and the received local frequency domain synchronized code to obtain a conjugate downlink synchronized code sequence, judging a location of a maximum value in the conjugate downlink synchronized code sequence, and calculating a frequency deviation according to the location of the maximum value.

The local frequency domain synchronized code may be configured to construct the local frequency domain synchronized code in the following way: performing a frequency shift action on a preconfigured synchronized code; after completing the frequency shift action, eliminating an influence of a timing deviation and multi-path on the preconfigured synchronized code to obtain the local frequency domain synchronized code.

In general, the method for estimating provided in the invention can realize a stable work with no need of a precise sampling value location, an accurate timing synchronization, or even obtaining the information for the multi-path distribution and locations.

PREFERRED EMBODIMENTS OF THE PRESENT INVENTION

Both the synchronized code used in the TD-SCDMA and the midable sequence length are short, so the existing frequency deviation estimation method has considerable performance degradation in the circumstances, such as the sampling location deviation, intensive multi-path distribution and so on, and may become a biased estimation in some scenes to cause the system not to work normally. One solution is to ensure that the work circumstance of the existing estimation method meets the requirement through technologies, such as precise timing synchronization, precise multi-path location estimation, inter-path interference cancellation and so on, which, however, are usually complex and can hardly ensure the accuracy in bad scenes; in addition, most of these technologies are dependent on the control precision of the AFC themselves, thus causing the system to be rather sensitive to the work scene and to be not stable enough.

The basic principle of the invention is as follows: a local frequency domain synchronized code is constructed to be the reference, a correlation operation is performed between the received downlink synchronized code after transformation to the frequency domain and the local frequency domain synchronized code to obtain the location of the maximum correlated value as the frequency deviation estimation result. The local frequency domain synchronized code is a group of synchronized code sequences suffering from different frequency deviations. The rule for the correlation operation is as follows: for example, when a correlation operation is performed between the sequence a1, a2, . . . , an and the sequence b1, b2, . . . bn, each element in the b sequence, after being conjugated, is multiplied by the element of the a sequence at a corresponding location to generate a sequence of a1*conj (b1), a2*conj(b2), . . . an*conj(bn), wherein, the conj is complex number conjugate operation, and the sequence is then added accumulatively for a sum, sum(a1*conj(b1), a2*conj (b2), . . . an*conj(bn)), wherein, the sum means a summation operation.

The implementation scheme is divided into a pretreatment process and a frequency deviation estimation process, wherein, the pretreatment process is to generate the local frequency domain synchronized codes, and it needs to be performed when synchronized code numbers change, due to the starting up of the UE or the switching of service cells; the frequency deviation estimation process needs to be performed when the UE receives the downlink synchronized codes of each sub-frame. The synchronized code numbers are referred to the identifiers pre-distributed to every cell to distinguish the cells when distance between two cells is small and the two cells use the same frequency. The downlink synchronized codes are referred to a sequence transmitted from the BS to the UE for the UE to perform timing synchronization and frame synchronization, and actually the UE has pre-configured the downlink synchronized codes to be issued from the BS.

The pretreatment process may also be performed at the BS side, i.e. the local frequency domain synchronized codes are generated by the BS and then issued to the UE.

The specific embodiments of the invention will be described below in detail with reference to the drawings.

Figure 1:
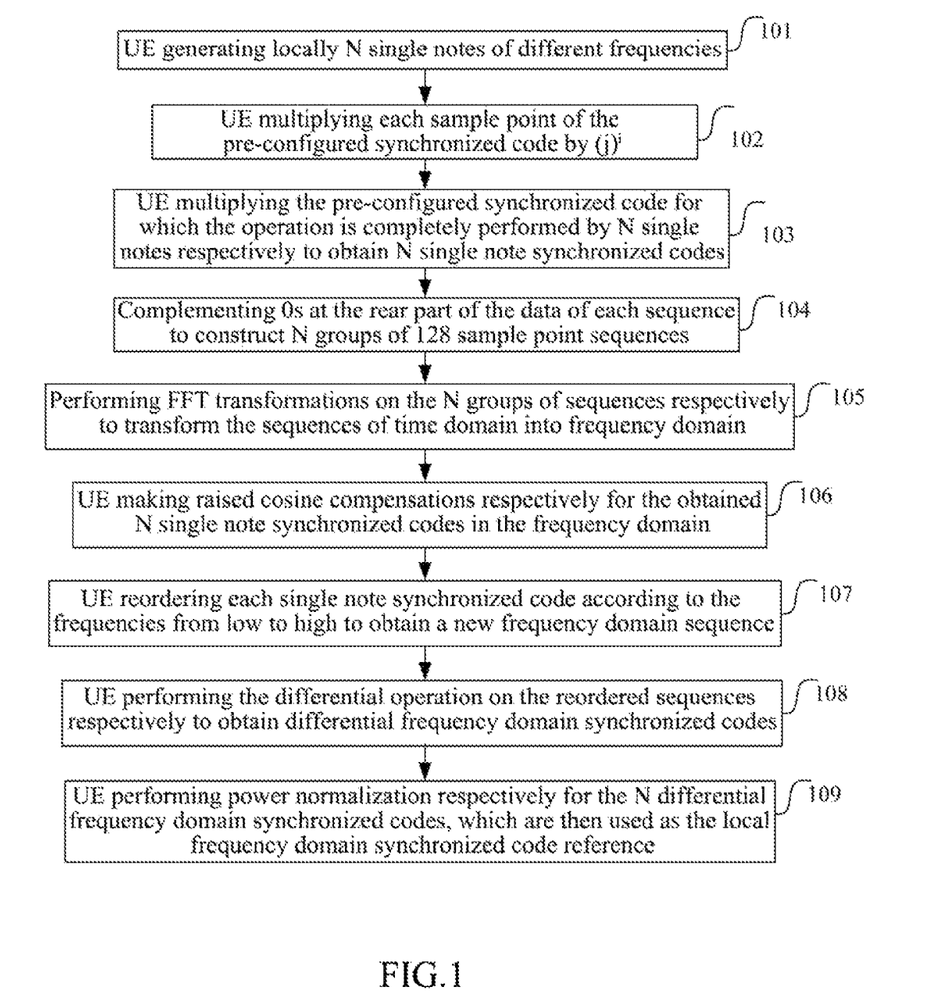
FIG. 1 is a flowchart of the pretreatment process in the embodiment of the invention.

FIG. 1 is the pretreatment process in an embodiment, which will be described by taking the UE side performing the pretreatment process as an instance below, comprising:

101, the UE generating locally N signals of different frequencies, wherein, N≥3;

the above signals are preferably single notes.

N is not smaller than 3, and when N=3, the signals comprise a 0 frequency single note, a positive frequency single note and a negative frequency single note.

When the single notes are used, 64 sample points may be selected as the length of the single notes by reference to the length of the synchronized codes, and single multiple of the chip is selected. The method for generating single notes may be any of existing methods.

The N single notes may comprise one 0 frequency single note, and (N−1)/2 positive frequency single notes and (N−1)/2 negative frequency single notes respectively. For example, when N=127, the signals comprise respectively 63 positive frequency single notes and 63 negative frequency single notes, and 156.25 Hz may be selected as the frequency interval between the signal notes, and −9843.75 Hz~+9843.75 Hz may be selected as the frequency estimation range. The frequency estimation range of −9843.75 Hz~+ 9843.75 Hz is selected based on the fact that the UE uses a crystal oscillator of 3 ppm, the maximum frequency deviation of which under a 2 GHz carrier is ±6 kHz and taking into consideration of the frequency deviation of the BS and Doppler effect of channels, on the basis of which some redundancy is retained. Different selections may be made for different crystal oscillators. The frequency interval of 156.25 Hz, similar to the frequency estimation range, may be selected adaptively.

When N is an even number, the number of positive frequency single notes will be different from the number of negative frequency single notes with exclusion of one frequency single note of 0. At the moment, it may be selected to generate one more positive frequency single note or one more negative frequency single note.

102: the UE multiplying each sample point of the pre-configured synchronized code (the synchronized code to be issued by the BS) by $(j)^i$, wherein, j is a complex number unit, and i is the number of the location of the synchronized code sample point;

for example, the $o^{th}$ location sample point of the synchronized code is multiplied by 1; the $1^{th}$ location sample point of the synchronized code is multiplied by j; the $2^{th}$ location sample point of the synchronized code is multiplied by $j^2$.

103: the UE multiplying the pre-configured synchronized code for which the $(j)^i$ operation has been performed by N single notes respectively to make a frequency shift action for the pre-configured synchronized code to obtain N single note synchronized codes;

104: when the single note has 64 sample points, each sequence of the N single note synchronized codes having 64 sample points, and complementing 64 0s at the rear part of the data of each sequence to construct N groups of 128 sample point sequences;

The number of points of the sequences is increased to 128 in time domain, since the FFT (Fast Fourier Transform) transformation will be performed subsequently for the N groups of sequences, which may improve the resolution in frequency domain after the FFT transformations.

105: performing FFT transformations on the N groups of sequences respectively to transform the sequences of time domain to the frequency domain;

the above action may be represented as: PtsF=FFT (PtsT.*SftF,128), wherein, PtsT represents the pre-configured synchronized code for which the $(j)^i$ operation has been performed, SftF represents a single note, PtsF represents the sequence in the frequency domain obtained after the FFT transformation, and 128 represents to perform 128 point FFT transformation.

106: the UE making compensations respectively for the obtained N single note synchronized codes in the frequency domain to adapt to the base band signals;

here the raised cosine compensation is preferentially used to obtain the optimal compensation effect, and square raised cosine compensation may also be performed.

Figure 2:
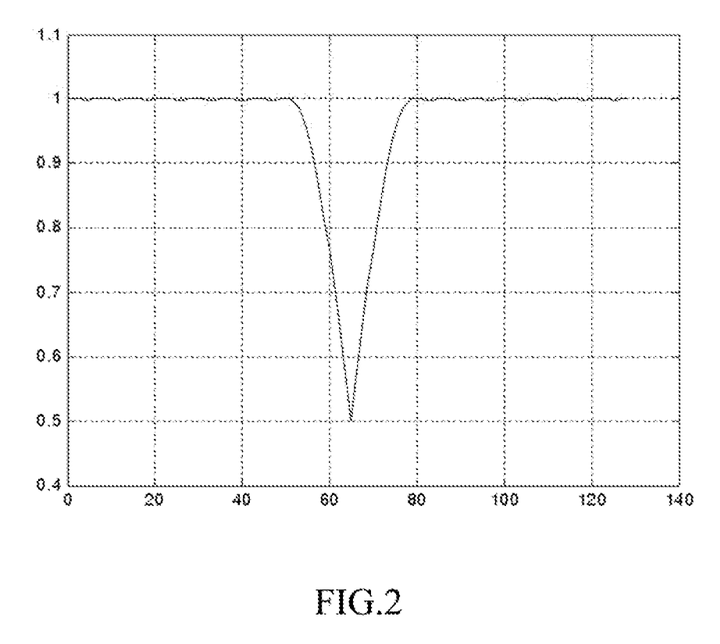
FIG. 2 is a diagram of the characteristics of the raised cosine complementation sequence used in the invention.

Since the base band signals at the UE side is obtained after the BS performs a square raised cosine filtering shaping on the BS signals and the UE performs a square raised cosine filtering matching, after the square raised cosine filtering shaping, frequency range of the BS signals is −800 kHz~+800 kHz, wherein, there is no decay in 0~480 kHz, and power is attenuated to its half value in 480 kHz~640 kHz, and power is attenuated to 0 at 800 kHz, while the situation in −800 kHz~0 is symmetrical with the above, i.e. starting from −640 kHz~− 480 kHz and 480 kHz~640 kHz, the signals have come into the roll-off bandwidth (gradually attenuated bandwidth) of the raised cosine filter, so raised cosine complementation is performed for the N groups of sequences respectively (two times of square raised cosine filtering are equivalent to one time of raised cosine filtering) to match the received frequency domain signals more accurately, wherein, reference may be made to FIG. 2 for the characteristics of the complementation sequence.

In the FIG. 2, the horizontal ordinate represents sample points, and the vertical ordinate represents amplitudes. When complementation is performed for the sequences, the frequency corresponding to the sample point in the sequence is multiplied by the amplitude of the sample point in FIG. 2.

107: the UE reordering each single note synchronized code according to the frequencies from low to high to obtain a new frequency domain sequence, and cutting out a frequency range of −640 kHz~640 kHz;

since after the FFT transformation, 0 is as the line to divide the sequence, whose sample points in the front part are corresponding to positive frequencies and sample points in the rear part are corresponding to negative frequencies, which is not a monotonously increasing relation, but the frequencies of the reordered sequences meet the monotonously increasing relation to afford convenience for the subsequent differential operation.

The practical bandwidth of the TD signals is −800 kHz~800 kHz, but the power of the signals outside 640 kHz takes a very small ratio of the total power, so, for the simplicity of the operation, only the signals in −640 kHz~640 kHz are retained to participate the operation. Of course, different frequency ranges may be cut out as needed, and there is no limitation here.

For example, the reordering of the sequence may be represented as: PtsF=PtsF([65:128,1:64],:), wherein, PtsF is the frequency domain synchronized code variable, which has a total of 128 points, and the front 64 points (1~64) are interchanged with the rear 64 points (65~128) in position in the step.

108: the UE performing the differential operation on the reordered sequences respectively to obtain differential frequency domain synchronized codes;

the process of the differential operation is: multiplying each datum in the sequence by the conjugate of the datum of the sequence number plus 1 in the sequence to generate a group of new sequences.

In view of the fact that the timing deviation will cause the phase in the frequency domain to increase linearly along with the frequency point, and the multi-path effect of the wireless channel will cause the frequency selectiveness effect of the received signal in the frequency domain, and the differential operation here can remove the influence of timing deviation and impress greatly the influence of the multi-path (the frequency selectiveness).

The differential operation can be represented as: PtsF=PtsF (1:end −1,:).*conj(PtsF(2:end,:)), wherein, PtsF is the frequency domain sequence generated in the step 107, and each datum in the sequence is multiplied by the conjugate of the datum of the sequence number plus 1 in the sequence to generate a group of new sequence.

If the reordering in the step 107 is not performed, differential operation is performed here respectively for the adjacent sample points in the sample points 0~63 and the adjacent sample points in the sample points 67~127, and then differential operation is performed again for the sample points 0 and 127, thus obtaining the differential frequency domain synchronized codes.

109: the UE performing power normalization respectively for the N differential frequency domain synchronized codes, i.e. making the power of every differential frequency domain synchronized code identical to be the local frequency domain synchronized code reference.

The frequency points of the above N groups single notes are divided evenly. In view of the fact that high estimation precision is only needed practically near the 0 frequency and the precision far away from the 0 frequency has little influence for the convergence rate in the scene where the AFC is applied, the frequency points may be set in a way of successive interval bisection. The successive interval bisection method means using the maximum frequency needing to be estimated, ½, ¼, ⅛, . . . of the maximum frequency as the practical frequency points. For example, when the estimation range is selected to be −8 kHz~+8 kHz, the frequency points 8 kHz, −8 kHz, 4 kHz, −4 kHz, 2 kHz, −2 kHz, 1 kHz and −1 kHz are selected as the frequency points, which may reduce effectively local storage space and operation volume. When N=127, the local frequency domain reference in the interval bisection method is 13 groups.

Figure 3:
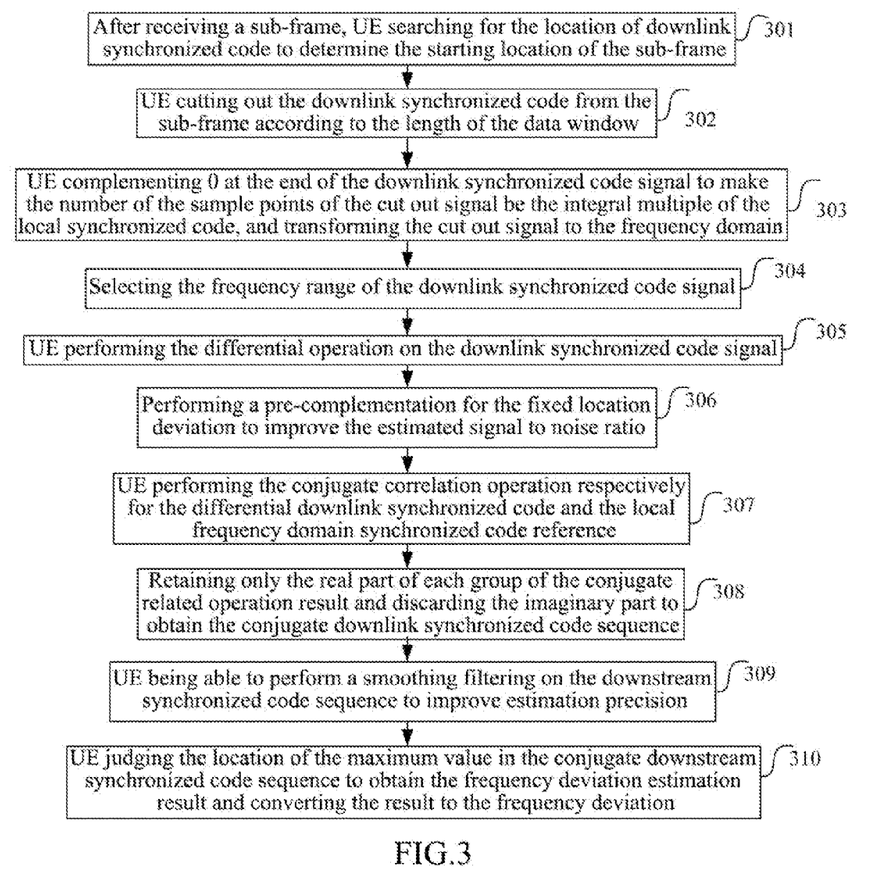
FIG. 3 is a flowchart of the frequency deviation estimation process in the embodiment of the invention.

FIG. 3 is the frequency deviation estimation process in the embodiment, comprising:

301: after receiving a sub-frame, UE searching for the location of downlink synchronized code to determine the starting location of the sub-frame;

each sub-frame having a downlink synchronized code, and the starting location of the sub-frame is determined once the downlink synchronized code is found.

Figure 4:
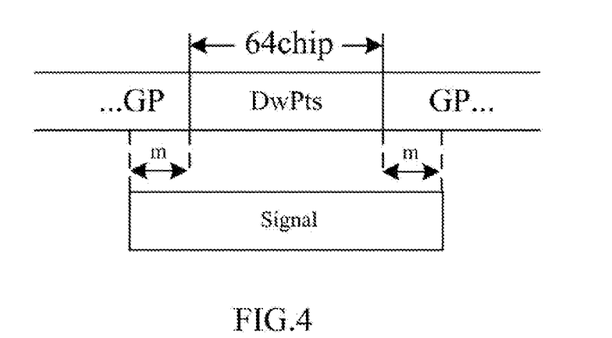
FIG. 4 is a diagram of the data window used in the invention.

302: the UE cutting out the downlink synchronized code signal from the sub-frame according to the length of the data window, wherein the length of the data window is predetermined, for example, the length may be determined as the length composed of the downlink synchronized code and m chips of sample points on the left and right side respectively, m≥0;

As shown in FIG. 4, the length of the cut out signals is the length of the downlink synchronized code plus the length of m chips on the left and right side respectively. The downlink synchronized code is 64 chips, and by adding m chips of sample points in either side of the downlink synchronized code, it can be ensured that the whole downlink synchronized code can be cut out completely when there exists a timing deviation of no more than m chips.

In view of the maximum possible timing shift and time delay extension, the value of m here is 8.

303: the UE complementing 0 at the end of the downlink synchronized code signal to make the number of the sample points of the cut out signal be an integral multiple of the local synchronized code, and transforming the cut out signal to the frequency domain;

Since the signal bandwidth is 1.6 MHz, considering that sampling rate needs to be larger than the signal bandwidth and chip rate is 1.28 MHz, twice of chip rate may be used as the sampling rate. The data widow is 64 chip+16 chip, and there are 160 sample points for the synchronized code plus the both ends of protection bands according to the sampling rate of twice of chip rate. 96 0s may be complemented at the rear part of the cut out signal to compose a time domain sequence of 256 points, which is an integral multiple of both the local synchronized code and 2 and thus facilitates implementation of the FFT transformation.

SignalF=FFT([Signal; zeros(96,1)]), FFT transformation is performed after complementation of 96 zero points, wherein, the Signal represents the received signal in the time domain, and the SignalF represents the frequency signal after the transformation.

If the number of points of the cut out signal is an integral multiple of the local synchronized code, the cut out signal may not be complemented with 0 and may be transformed to the frequency domain directly. For example, if the data window is determined to be 64 chip and m is 0, the cut out signal may not be complemented with 0 and the frequency domain transformation may be performed directly.

304: selecting the frequency range of the downlink synchronized code signal corresponding to the frequency domain range of the local synchronized code;

the frequency domain range of the local synchronized code is −640 kHz-640 kHz, the frequency domain range of the cut out signal may be or may be not the same with that of the local synchronized code, provided that they have an intersection.

SignalF=SignalF([193:256,1:64]), SignalF represents the transformed frequency domain signal variable having a total of 256 points generated in the step 300, and the first 64 points (1~64) and the last 64 points (193~256) are interchanged before the operation in the step.

305: the UE performing the differential operation on the downlink synchronized code signal;

SignalF=SignalF(1:end −1).*conj(SignalF(2:end)), wherein, SignalF represents the frequency domain signal quality generated in the step 304; each datum in the sequence is correspondingly multiplied by the conjugate of the datum of the sequence number plus 1 in the sequence to generate a new group of sequences.

306: considering that when selected, the data window has a known shift of 8 chip compared with the downlink synchronized code, performing a pre-complementation for the fixed location shift to improve the estimated signal to noise ratio.

SignalF=SignalF*exp(−2*pi*j/16), wherein, SignalF represents the frequency domain signal variable generated in the step 305, the exponential phase of the exp is the phase corresponding to the ⅛ pi; since the timing deviation causes the phase rotation increasing linearly along with the frequency, and the rotation is a constant phase after the difference, the complementation method in the step is that the frequency domain rotation complements the influence of the fixed time domain timing deviation. In addition to the way used in the step, the way of timing translation complementation in the time domain may also be used, i.e. the expression in the step 303 changes to SignalF=FFT([Signal(17: end); zeros(96,1); Signal(1:16)]), where time domain signal translates towards the left by 16 sample points (8 chips).

307: the UE performing the conjugate correlation operation respectively for the differential downlink synchronized code and the local frequency domain synchronized code reference;

308: to improve signal to noise ratio and smooth the filtering gain and reduce the complexity to realization, retaining only the real part of each group of the conjugate correlation operation result and discarding the imaginary part to obtain conjugate downlink synchronized code sequence;

CorrC=real(SignalF'*PtsF)', wherein, SignalF represents the frequency signal obtained in the step 306, PtsF represents local frequency domain synchronized code, and the real represents the operation for taking the real part of the complex number, and CorrC represents the generated correlation result, i.e. the conjugate downlink synchronized code sequence, and each value in the sequence is one-to-one corresponding to each reference frequency of the local code.

309: since the practical frequency deviation of the downlink synchronized codes is a gradual process in the observation period of 5 ms, the UE being able to perform a smoothing filtering on the downlink synchronized code sequence to improve estimation precision;

for the purpose of simplicity, an IIR filter of level 1 may be used and the value of a typical filter coefficient FltCoef is 1/16.

CorrR=(1−FltCoef)*CorrR+FltCoef*CorrC, here is the result after several observations, wherein, CorrC represents the current correlation result of a single time, FltCoef represents the filtering coefficient, CorrR represents the correlation cumulant of the several times of results, FltCoef determines the weight of the current correlation result of a single time in the correlation cumulant, and the smaller the FltCoef is, the better the effect of the smoothing filtering is, on the contrary, the effect of the smoothing filtering is weaker.

310: the UE judging the location of the maximum value in the conjugate downlink synchronized code sequence to obtain the frequency deviation estimation result and converting the result into the frequency deviation.

[CorrM, FreqEsti]=max(CorrR), CorrR is a group of correlation cumulants which are one-to-one corresponding to the frequency deviations, wherein, the frequency deviation corresponding to the maximum cumulant is the frequency deviation estimation value needing to be calculated, max represents the maximum value calculation operation, CorrM represents the numerical value of maximum correlation cumulant, FreqEsti represents the index of the maximum correlation cumulant, for example, CorrR is 65, 78, 33, 58; then the calculation result of the CorrM is 78, and the calculation result of the FreqEsti is 2.

FreqEsti=(FreqEsti−64)*156.25, the equation converts the index value of the frequency deviation estimation to the size of the practical frequency deviation, whose correspondence is determined by the construction mode of the single note signal frequency in the step 101. In the above step of this embodiment, N is 127, the single note frequency interval is 156.25 Hz, the frequency increases by 156.25 Hz every time along with the increase of the index, the practical frequency of the $64^{th}$ single note is 0 Hz, so there is the correspondence described in the equation.

The influence of the sampling location deviation and the timing deviation will be further analyzed below to make the effect of the embodiment clearer. The sampling location deviation and the timing deviation may cause the linear phase rotation increasing along with the frequency in the frequency domain, and the rotation change is a constant phase value for a differential frequency domain sequence. When the approach of maximum value of the real number is used, the amplitude of a projection value is only slightly influenced. But even when the timing deviation reaches up to 4 chips and the projection angle is pi/16, the projection value is just reduced to 0.9808 of the original value, the influence of which to the SNR is almost negligible.

Figure 5:
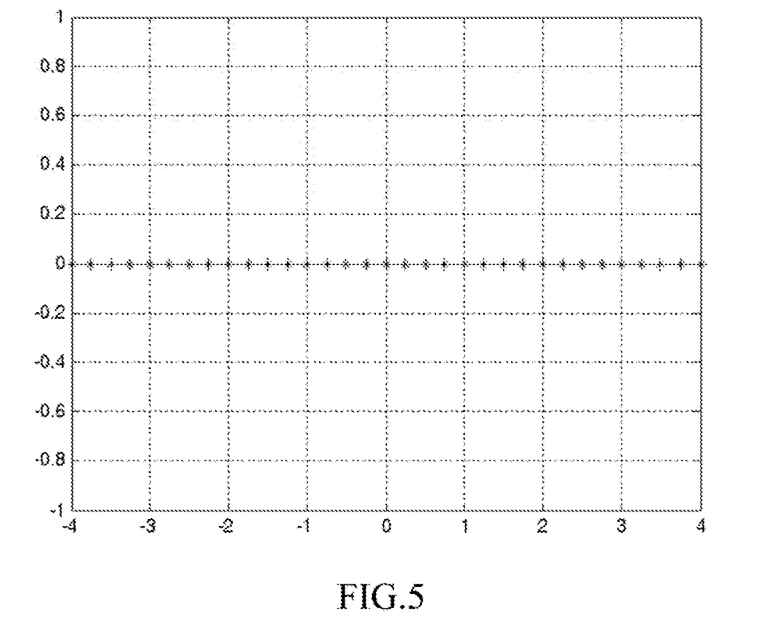
FIG. 5 is a diagram of the influence of the sampling location deviation and the timing deviation on the estimated value in the invention.

FIG. 5 emulates the influence of the sampling location deviation and the timing deviation to the estimation value, wherein, the exciting signal is a synchronized code with no frequency deviation, and the sampling deviation gradually varies from −4 chip to +4 chip, with ¼ chip transition each time.

Considering that the maximum sampling value location deviation of 2 times of chip rate sampling is ¼ chip, which is identical with the theoretical analysis, the estimation method of the embodiment has relation to neither the sampling value location nor the timing deviation, i.e. the method depends neither the timing synchronization precision of the system nor the precise synchronized code path location.

Figure 6:
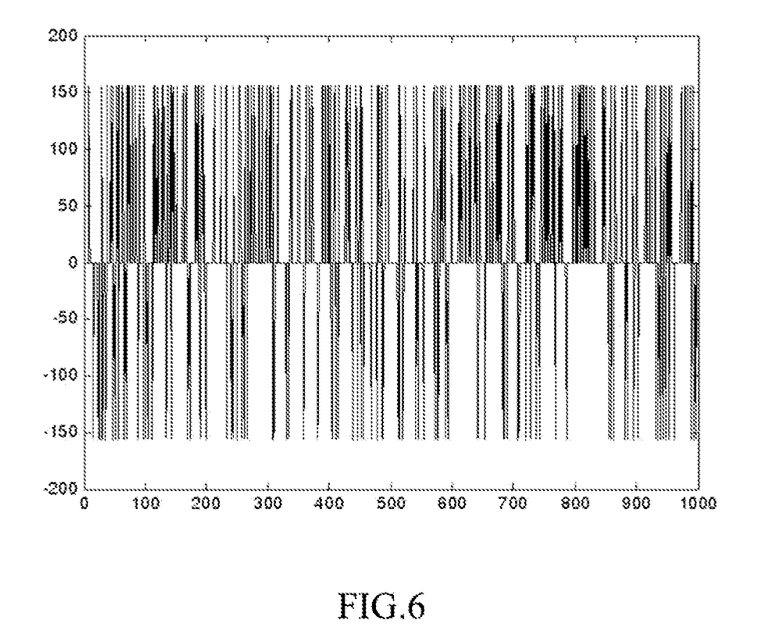
FIG. 6 is a diagram of the influence of the random multi-path distribution on the estimated value in the invention.

In addition, since the differential operation is performed in the frequency domain, the frequency selectivity caused by the multi-path has been greatly impressed, which is identical with the influence of the sampling value location deviation and the timing deviation. The worst scene is also considered here to emulate a random 4-path channel, wherein, the arriving time of the 4 paths is 0~3 chip, channel coefficients are all independent complex Gaussian random numbers, each sub-frame is regenerated and is not subjected to power normalization. The estimation result is as shown in FIG. 6 under the situation when no practical frequency deviation or channel noise exists.

Thus it can be seen that even under the completely random channel situation, the influence of multi-path distribution on the frequency deviation estimation is very small. It is notable that the estimation method here does not use the multi-path location information, i.e. the method of the embodiment could work well with no need of the multi-path location estimation.

The application situation of the method will be described below by taking as an example the TD-SCDMA AFC loop circuit, constructed based on the method of the embodiment.

Considering that the destination of the AFC is to correct local crystal oscillator frequency deviation and the local crystal oscillator frequency deviation is a parameter changing very slowly, it is not necessary to put the frequency deviation estimation result of the current time to the AFC control loop circuit completely to perform the complementation from the perspective of improving system stability. The estimation value here is multiplied by a small factor to be the frequency deviation adjustment amount to be practically complemented and the typical value is 1/256.

TotalFreqEsti=TotalFreqEsti+AdjCoef*FreqEsti, wherein, FreqEsti represents the current frequency deviation estimation value, AdjCoef represents the adjustment complementation, TotalFreqEsti represents the total frequency deviation estimation value, the physical meaning of the equation is that the residual frequency deviation estimation value of each time is included in the total frequency deviation in some discount to reduce the influence of the estimation error of a single time on the frequency deviation adjustment.

Typical parameters, FltCoef=1/16, AdjCoef=1/256, are used to perform simulation comparison for the performance of the AFC loop circuit constructed in the embodiment in various scenes.

Figure 7:
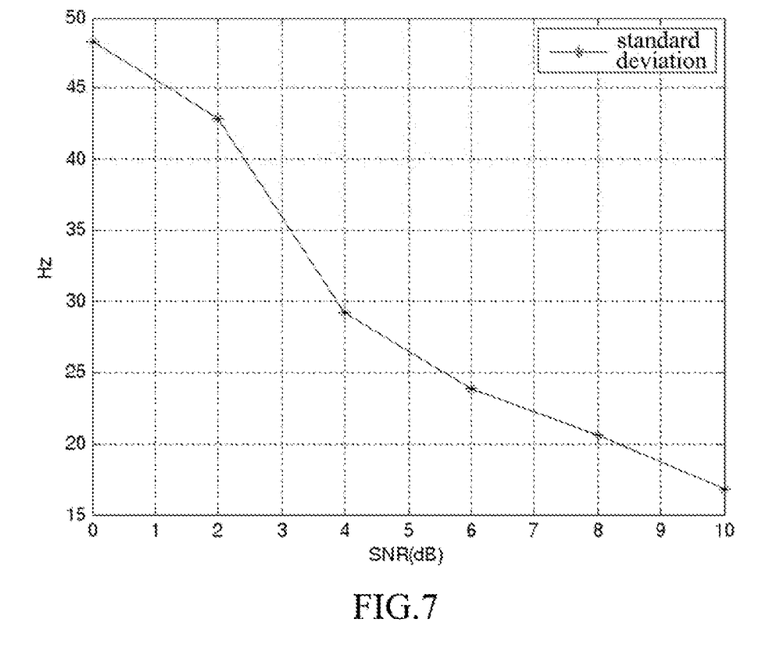
FIG. 7 is a diagram of the standard deviation of the residual frequency deviation in the AWGN channel in the invention.

Firstly, the standard deviation performance of the AFC loop circuit residual frequency deviation under the AWGN channel is analyzed. Please see the FIG. 7, the simulation number of each sample point in the FIG. 7 is 10,000 sub-frames. It can be seen the AFC loop circuit constructed based on the method has a good performance under the AWGN channel, and the standard deviations for 0 dB, 5 bB and 10 dB are respectively better than 50 Hz, 30 Hz and 20 Hz.

Figure 8:
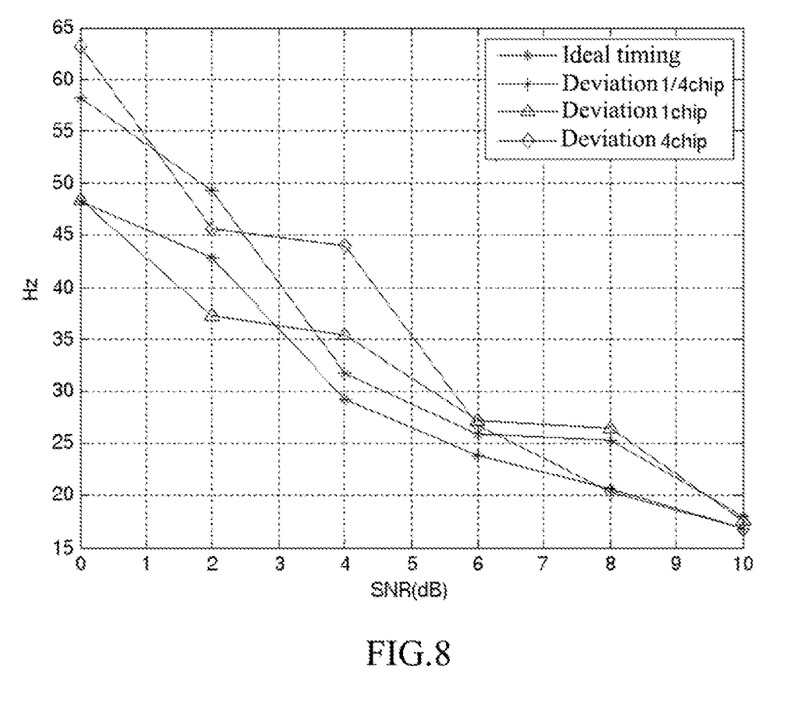
FIG. 8 is a diagram of the influence of the sampling location deviation and the timing deviation on the residual frequency deviation performance in the invention.

The next is the influence of the location deviation and timing deviation of the simulation sampling values on the AFC loop circuit residual frequency deviation performance. The four curves in FIG. 8 correspond respectively to the ideal timing, 1/4 sampling value location deviation, 1 chip timing deviation and 4 chip timing deviation. Identical with the theoretical analysis, the AFC loop circuit constructed in the method has basically no relation to the sampling value location deviation and timing deviation.

Figure 9:
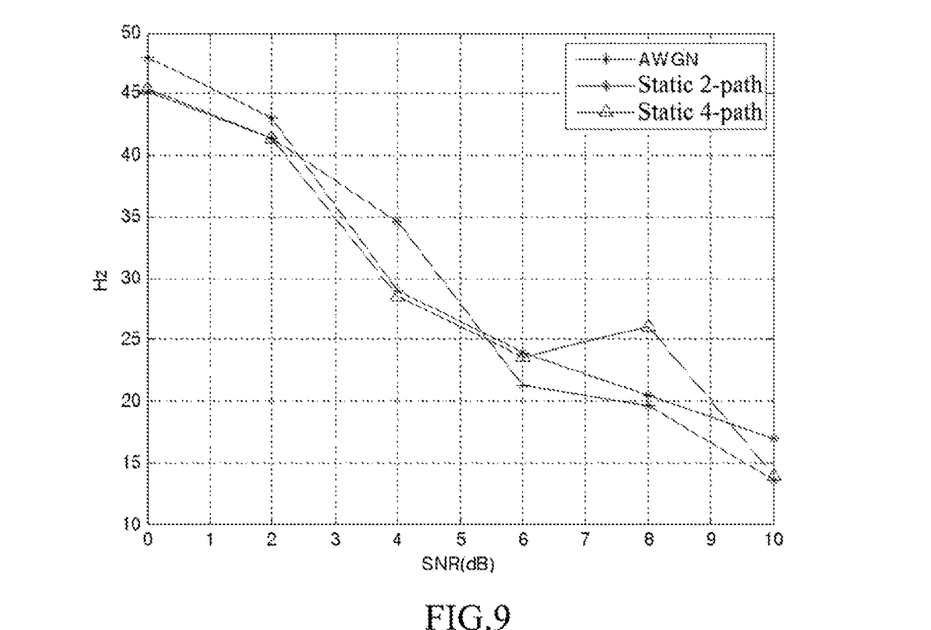
FIG. 9 is a diagram of the influence of the static multi-path on the residual frequency deviation performance in the invention.

On this basis, the influence of the multi-path channel on the AFC loop circuit performance is further estimated. In the FIG. 9, the performance under the circumstance of the static equal strength 2 paths is compared with that of the circumstance of the static equal strength 4 paths. The interval of the paths is 1 chip, and the energy and phase are identical. As can be seen, static multi-path has little influence on the performance.

Figure 10:
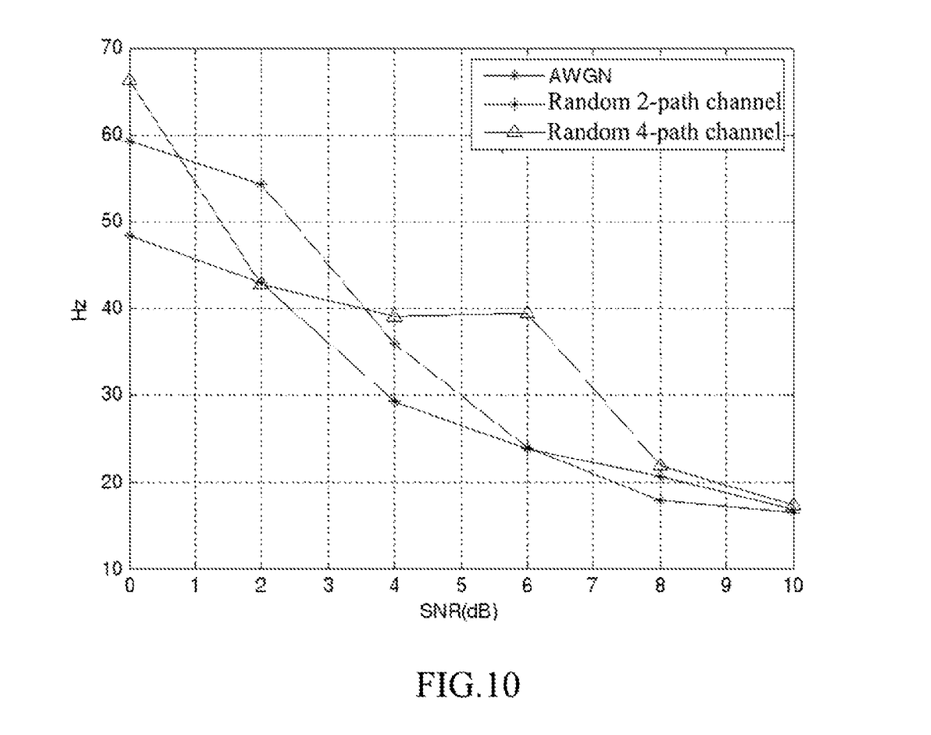
FIG. 10 is a diagram of the influence of the random multi-path channel on the residual frequency deviation performance in the invention.

In addition, the worst scene of multi-path is considered. The foregoing random 2-path channel and random 4-path channel are simulated, the time delay extensions are respectively 2 chip and 4 chip, the channel coefficients are both independent complex Gaussian random numbers, and each sub-frame is regenerated and not subjected to power normalization. Please see the FIG. 10, the simulation result indicates that the AFC loop circuit can work still stably in the situation that intensive multi-path exists and multi-path information is completely unknown, and the performance does not degrade apparently.

Figure 11:
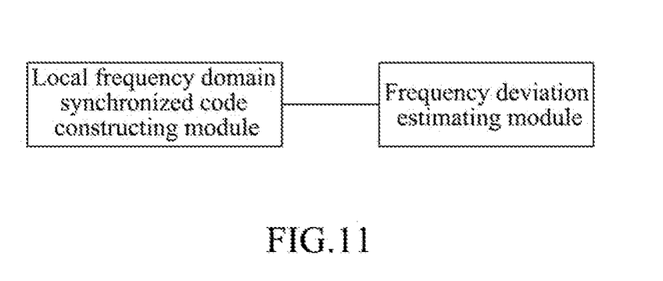
FIG. 11 is a structure diagram of the apparatus for estimating frequency deviation in the invention.

FIG. 11 is the apparatus for estimating frequency deviation in the embodiment, the apparatus comprising: a local frequency domain synchronized code constructing module and a frequency deviation estimating module that are interconnected, wherein, the local frequency domain synchronized code constructing module is configured to construct a local frequency domain synchronized code, and transmit the constructed local frequency domain synchronized code to the frequency deviation estimating module; wherein, the process for constructing the local frequency domain synchronized code comprises: performing a frequency shift action on a preconfigured synchronized code; after completing the frequency shift action, eliminating an influence of a timing deviation and multi-path on the preconfigured synchronized code to obtain the local frequency domain synchronized code;

the frequency deviation estimating module is configured to: after receiving a sub-frame, transform a downlink synchronized code of the sub-frame to a frequency domain, and perform a correlation operation between the transformed downlink synchronized code and the received local frequency domain synchronized code to obtain a conjugate downlink synchronized code sequence, judging a location of a maximum value in the conjugate downlink synchronized code sequence, and calculating a frequency deviation according to the location of the maximum value.

Please refer to the description for the content of the method for other functions of the modules of the above apparatus for estimating frequency deviation.

The above embodiments are just preferred embodiments of the invention, and are not intended to limit the invention, and for those skilled in the art, the invention may have various modifications and variations. Any modification, equivalent replacement, improvement, and so on, made within the scope of the sprit and the principle of the invention, should all be included in the protection scope of the invention.

INDUSTRIAL APPLICABILITY

Compared with the existing technology, the invention can realize a stable work with no need of a precise sampling value location, an accurate timing synchronization, or even obtaining the information for the multi-path distribution and locations.

What is claimed is:

1. A method for estimating frequency deviation, the method comprising the following steps that are performed by a user equipment (UE):

after receiving a sub-frame, transforming a downlink synchronized code of the sub-frame to a frequency domain, and performing a correlation operation between the transformed downlink synchronized code and a local frequency domain synchronized code to obtain a conjugate downlink synchronized code sequence; and judging a location of a maximum value in the conjugate downlink synchronized code sequence, and calculating a frequency deviation value according to the location of the maximum value;

wherein, the local frequency domain synchronized code is a group of synchronized code sequences influenced by different frequency deviations.

2. The method according to claim 1, further comprising: constructing the local frequency domain synchronized code in a following way:

performing a frequency shift action on a preconfigured synchronized code; and, after completing the frequency shift action, eliminating an influence of a timing deviation and multi-path on the preconfigured synchronized code to obtain the local frequency domain synchronized code.

3. The method according to claim 2, wherein, the step of performing a frequency shift action on a preconfigured synchronized code comprises:

generating signals of different frequencies;

multiplying each sample point in the preconfigured synchronized code respectively by $(j)^i$, wherein, j is a complex number unit, i is a location of the each sample point in the preconfigured synchronized code; and multiplying the synchronized code after completion of the $(j)^i$ operation by the generated signals respectively.

4. The method according to claim 3, wherein, the signals of different frequencies comprise a signal of 0 Hz frequency;

the step of calculating a frequency deviation value according to the location of the maximum value comprises:

multiplying a difference between the number of the location of the maximum value in the conjugate downlink synchronized code sequence and a number of the location of the 0 Hz frequency signal in the signals of different frequencies by a frequency interval of the signals of different frequencies to obtain the frequency deviation value.

5. The method according to claim 2, wherein, the step of eliminating an influence of a timing deviation and multi-path on the preconfigured synchronized code comprises:

transforming the preconfigured synchronized code to a frequency domain, and performing a differential operation on the synchronized code on the frequency domain to obtain the local frequency domain synchronized code.

6. The method according to claim 5, further comprising: before transforming the preconfigured synchronized code to a frequency domain, performing a complementation for the preconfigured synchronized code to be adaptive to a base band signal.

7. The method according to claim 6, wherein, the complementation is a raised cosine complementation.

8. The method according to claim 5, further comprising: before performing a differential operation on the synchronized code on the frequency domain, reordering each sample point of the synchronized code on the frequency domain according to a level of a frequency corresponding to each sample point.

9. The method according to claim 1, wherein, before the step of transforming a downlink synchronized code of the sub-frame to a frequency domain, the method further comprises:

searching for a location of the downlink synchronized code in the received sub-frame, cutting out a downlink synchronized code signal from the sub-frame according to a length of a data window; and if a number of sample points of the downlink synchronized code signal is not an integral multiple of a number of sample points of the local frequency domain synchronized code, then processing the downlink synchronized code signal to make the number of the sample points of the downlink synchronized code signal is an integral multiple of the number of the sample points of the local frequency domain synchronized code.

10. The method according to claim 9, wherein, the length of the data window is equal to a chip length of the downlink synchronized code plus m chip length respectively on a left side and on a right side of the downlink synchronized code, wherein, m≥0.

11. The method according to claim 9, further comprising: when the number of the sample points of the downlink synchronized code signal is an integral multiple of the number of the sample points of the local frequency domain synchronized code, performing a differential operation on the downlink synchronized code signal.

12. The method according to claim 11, further comprising: after performing the differential operation on the downlink synchronized code signal, performing a complementation to eliminate an influence of a fixed time domain timing deviation.

13. The method according to claim 1, wherein, the step of performing a correlation operation between the transformed downlink synchronized code and a local frequency domain synchronized code to obtain a conjugate downlink synchronized code sequence comprises: discarding an imaginary part of each correlation operation result and retaining a real part of each correlation operation result to obtain the conjugate downlink synchronized code sequence.

14. An apparatus for estimating frequency deviation, the apparatus comprising:

a processor; and a storage device for storing computer executable instructions that when executed by the processor cause the processor to:

construct a local frequency domain synchronized code, and transmit the constructed local frequency domain synchronized code to the frequency deviation estimating module;

after receiving a sub-frame, transform a downlink synchronized code of the sub-frame to a frequency domain, and perform a correlation operation between the transformed downlink synchronized code and the received local frequency domain synchronized code to obtain a conjugate downlink synchronized code sequence, judge a location of a maximum value in the conjugate downlink synchronized code sequence, and calculate a frequency deviation according to the location of the maximum value;

wherein, the local frequency domain synchronized code is a group of synchronized code sequences influenced by different frequency deviations.

15. The apparatus according to claim 14, wherein, the local frequency domain synchronized code is configured to construct the local frequency domain synchronized code in a following way:

performing a frequency shift action on a preconfigured synchronized code;

after completing the frequency shift action, eliminating an influence of a timing deviation and multi-path on the preconfigured synchronized code to obtain the local frequency domain synchronized code.

* * * * *